United States Patent [19]
Huang

[11] Patent Number: 5,890,856
[45] Date of Patent: Apr. 6, 1999

[54] CROSSBAR DEVICE FOR LIMITING CARGOES FROM FALLING

[76] Inventor: Han-Ching Huang, P.O. Box 63-247, Taichung, Taiwan

[21] Appl. No.: 92,148

[22] Filed: Jun. 5, 1998

[51] Int. Cl.[6] ........................................................ B60P 7/15
[52] U.S. Cl. .......................... 410/151; 410/143; 410/145
[58] Field of Search ................................. 410/143, 145, 410/151; 211/105.3; 254/12, 95, 109; 248/354.1, 354.6, 354.7, 200.1; 74/167, 169, 141.5

[56] References Cited

U.S. PATENT DOCUMENTS

| | | | |
|---|---|---|---|
| 3,049,328 | 8/1962 | Bishop | 410/151 X |
| 5,094,576 | 3/1992 | Fredelius | 410/151 |
| 5,443,342 | 8/1995 | Huang | 410/151 |
| 5,472,301 | 12/1995 | Wallen | 410/151 |
| 5,769,580 | 6/1998 | Purvis | 410/151 |
| 5,813,647 | 9/1998 | Chen | 410/151 X |

FOREIGN PATENT DOCUMENTS 14970   9/1980   European Pat. Off. ............ 211/105.3

*Primary Examiner*—Stephen T. Gordon
*Attorney, Agent, or Firm*—Charles E. Baxley, Esq.

[57] ABSTRACT

A crossbar device includes an outer tube with an inner tube retractably received in the outer tube, an adjusting device disposed to the outer tube and having two pawl members pivotally disposed therein which has a connecting member connected therebetween and the connecting member is actuated by an actuating member disposed to the adjusting device. A pressing member is movably received in the adjusting device and has an end thereof engaged with one of the pawl member so that when pushing the pushing member downwardly, the pawl members are pivoted and disengaged from an toothed surface of the inner tube so that the inner tube is freely moved corresponding to the outer tube.

5 Claims, 7 Drawing Sheets

CROSSBAR DEVICE FOR LIMITING CARGOES FROM FALLING

FIELD OF THE INVENTION

The present invention relates to a retractable crossbar device for limiting cargoes from falling in a truck trailer, and more particularly, to the crossbar device which is easily and rapidly adjusted its length.

BACKGROUND OF THE INVENTION

A conventional crossbar device for limiting cargoes in a truck trailer from falling is shown in FIGS. 1, 2 and 3. When cargoes 11 are stacked or received in the truck trailer 10, the crossbar device is often used to prevent the cargoes 11 from falling, especially when the cargoes 11 do not occupy all the interior space of the truck trailer 10. Generally, the crossbar device includes an outer tube 20, an inner tube 21 which has a second end thereof retractably received in a first end of the outer tube 20, and an adjusting means 30 fixedly connected to the first end of the outer tube 20 so as to position the inner tube 21 corresponding to the outer tube 20. The outer tube 20 has a first contacting member 201 disposed to a second end thereof and the inner tube 21 has a second contacting member 203 disposed to a first end thereof so that when the inner tube 21 is positioned by operating the adjusting means 30, the first and the second contacting member 201, 203 contact against two sidewalls 204, 205 of the truck trailer 10 so that the cargoes 11 are limited from falling during transportation. The adjusting means 30 includes a handle 31 from which two plates 310 extend, a cover member 300 connected to the two plates 310, and a first pawl 32 and a second pawl 33 respectively and pivotally connected to the two plates 310. Each of the first pawl 32 and the second pawl 33 has a protrusion 321, 331 extending laterally therefrom so that a flexible connecting member 34 is connected therebetween. The inner tube 21 has a toothed upper surface 22 so that the two pawl members 32, 33 are disengagably engaged with the toothed upper surface 22. The cover member 300 has an aperture 301 defined in a top thereof so that an actuating member 35 is pivotally inserted such that when pulling the actuating member 35, a lower end of the actuating member 35 depresses the flexible member 34 and pushes the two pawl members 32, 33 downwardly to engage with the toothed upper surface 22. When pivoting the handle 31, the inner tube 21 is pushed away from the outer tube 20 by the two pawl members 32, 33 like an operation of a known ratchet tool. When re-adjusting the position of the inner tube 21 corresponding to the outer tube 20, the actuating member 35 is pulled not to depress the flexible member 34 and the inner tube 21 is therefore freely pulled or pushed. However, the two pawl members 32, 33 drop because of gravity so that when rapidly pulling or pushing the inner tube 21, the inner tube 21 could be stopped by the pawl member(s). Furthermore, the adjusting means 30 is fixedly disposed to the first end of the outer tube 20 by welding at position 202 so that a total length of the adjusting means 30 and the outer tube 20 is so long that occupies space when being transported.

The present invention provides a crossbar device wherein an inner tube thereof can be rapidly moved corresponding to the outer tube without interruption by the pawl members. Such a crossbar device is expected to mitigate and/or obviate the disadvantage of the conventional crossbar device.

SUMMARY OF THE INVENTION

In accordance with one aspect of the present invention, there is provided a crossbar device comprising an outer tube with a first contacting member fixedly connected to a first end of the outer tube, an inner tube having a first end thereof retractably received in the outer tube and a second contacting member fixedly connected to a second end of the inner tube, and an adjusting means disposed to a second end of the outer tube. The inner tube has a toothed surface defined in an upper surface thereof.

The adjusting means includes a handle which two plates extend, each of which has a first and a second slot defined therethrough. A first pawl member and a second pawl member are respectively and pivotally connected between the two plates. Each of the first pawl member and the second pawl member has a transverse bar extending laterally from a lower end thereof so that a connecting member is connected therebetween. A cover member is connected to the second end of the outer tube and has an actuating member movably inserted therein so as to press the connecting member to lower the respective lower ends of the first pawl member and the second pawl member to engage with the toothed surface.

A pushing member is disposed between the two plates and movably between the first slots and the second slots. The pushing member has an end thereof engaged with an upper end of the second pawl member so that when pushing the pushing member downwardly, the second pawl member together with the first pawl member are pivoted to be disengaged from the toothed surface of the inner tube.

It is an object of the present invention to provide a crossbar device which has a pushing member, an inner tube is rapidly moved corresponding to an outer tube by pushing the pushing member downwardly.

It is another embodiment of the present invention to provide a crossbar device wherein the outer tube is disengagably connected to the outer tube.

Further objects, advantages, and features of the present invention will become apparent from the following detailed description with appropriate reference to the accompanying drawings.

DETAILED DESCRIPTION OF THE PREFERRED EMBODIMENT

Figure 1:
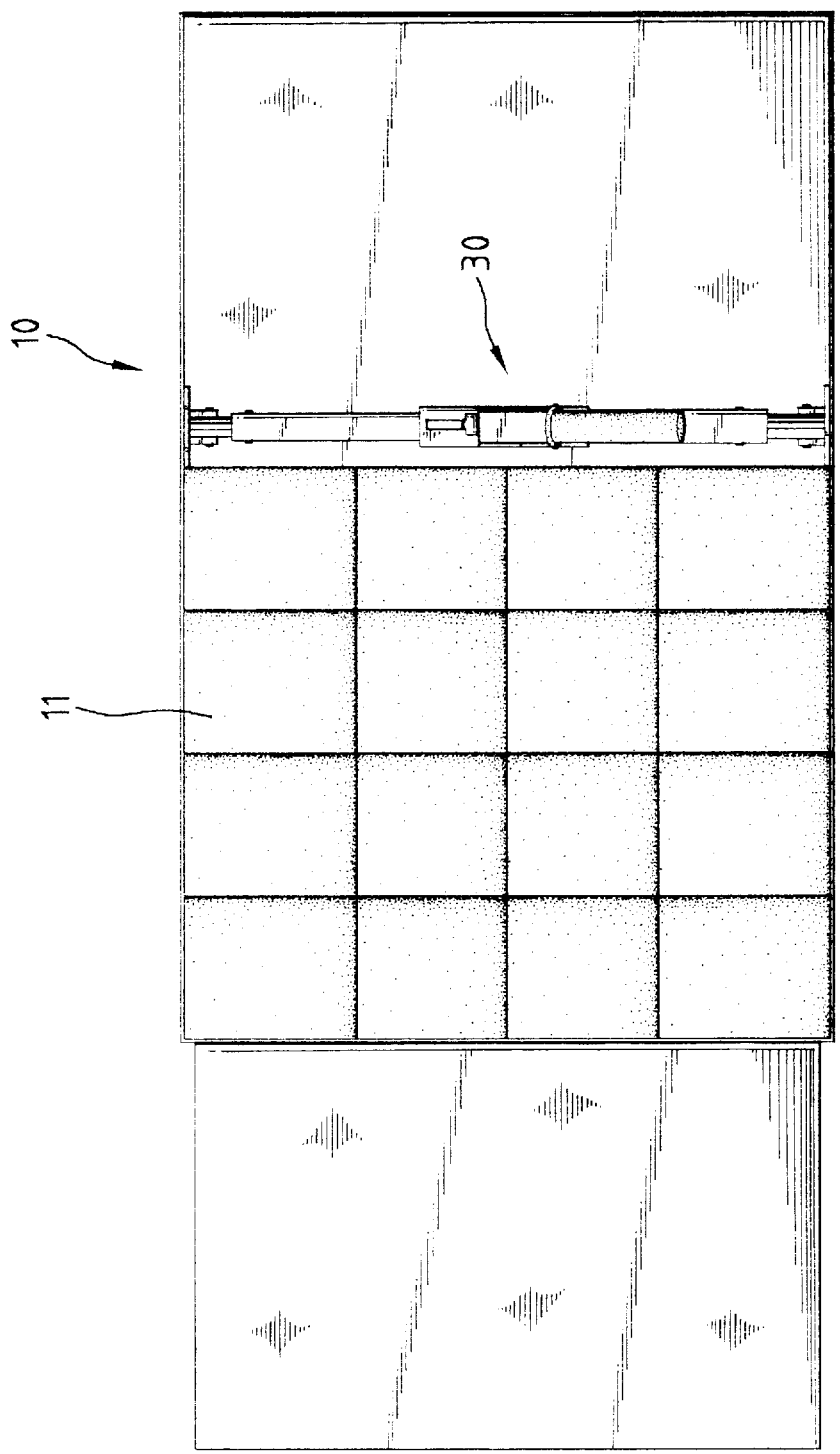
FIG. 1 is an illustrative view to show a conventional crossbar device is used in a truck trailer.
Figure 2:
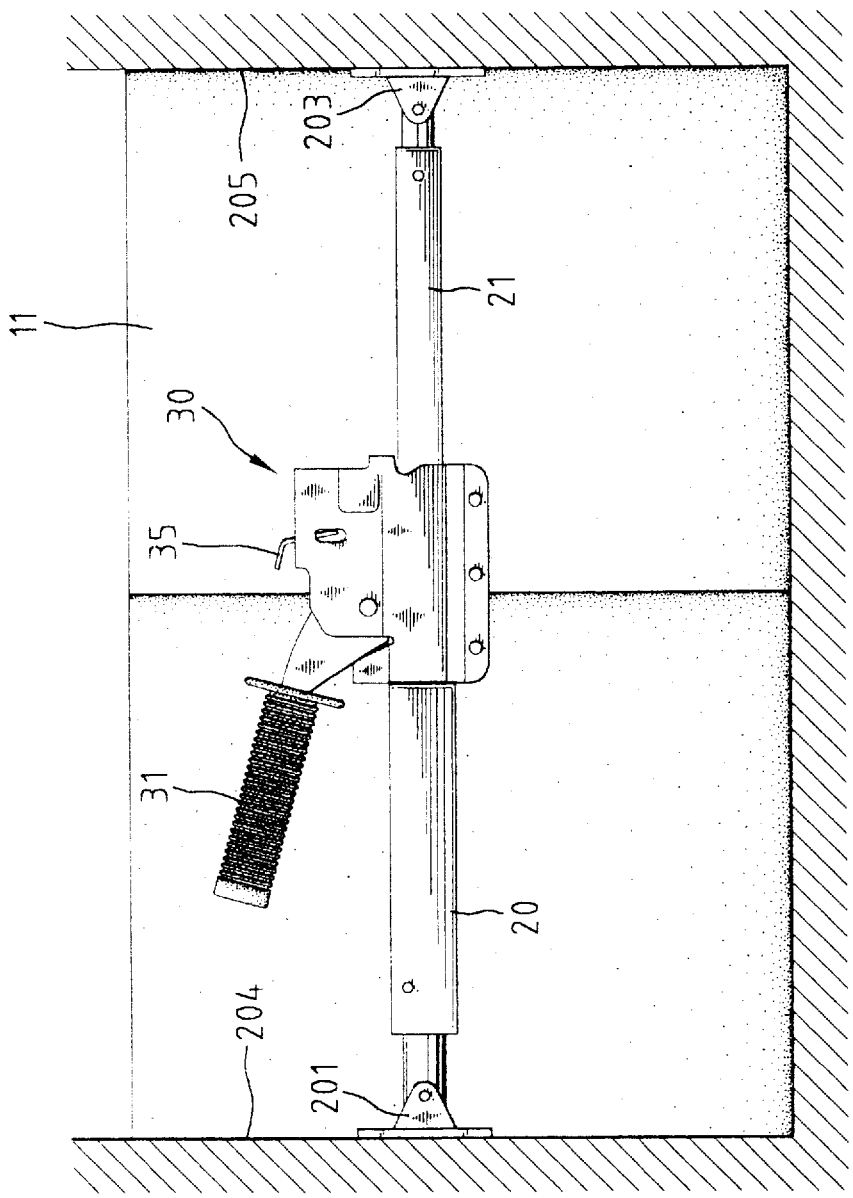
FIG. 2 is an end view to show the conventional crossbar device used in the truck trailer to limit cargoes from falling.
Figure 3:
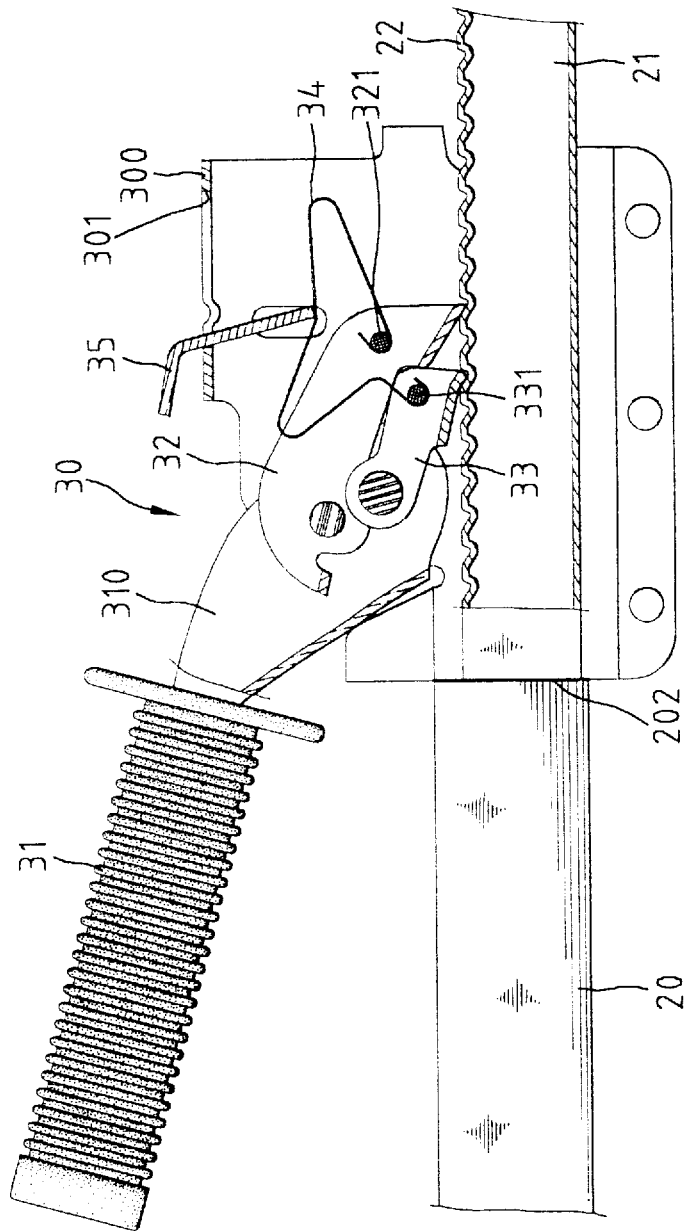
FIG. 3 is a side elevational view, partly in section, of the conventional crossbar device.
Figure 4:
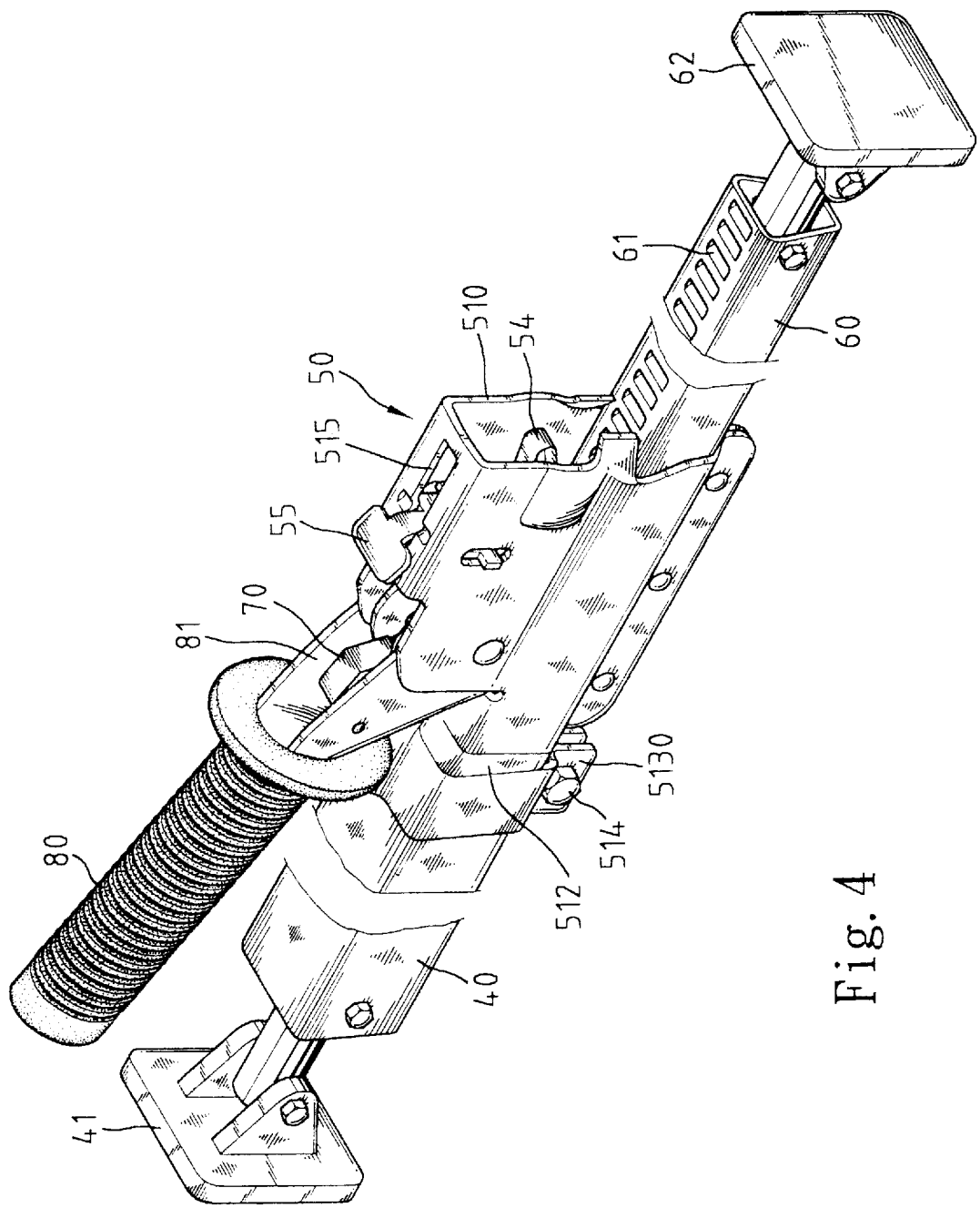
FIG. 4 is a perspective view of a crossbar device in accordance with the present invention.
Figure 5:
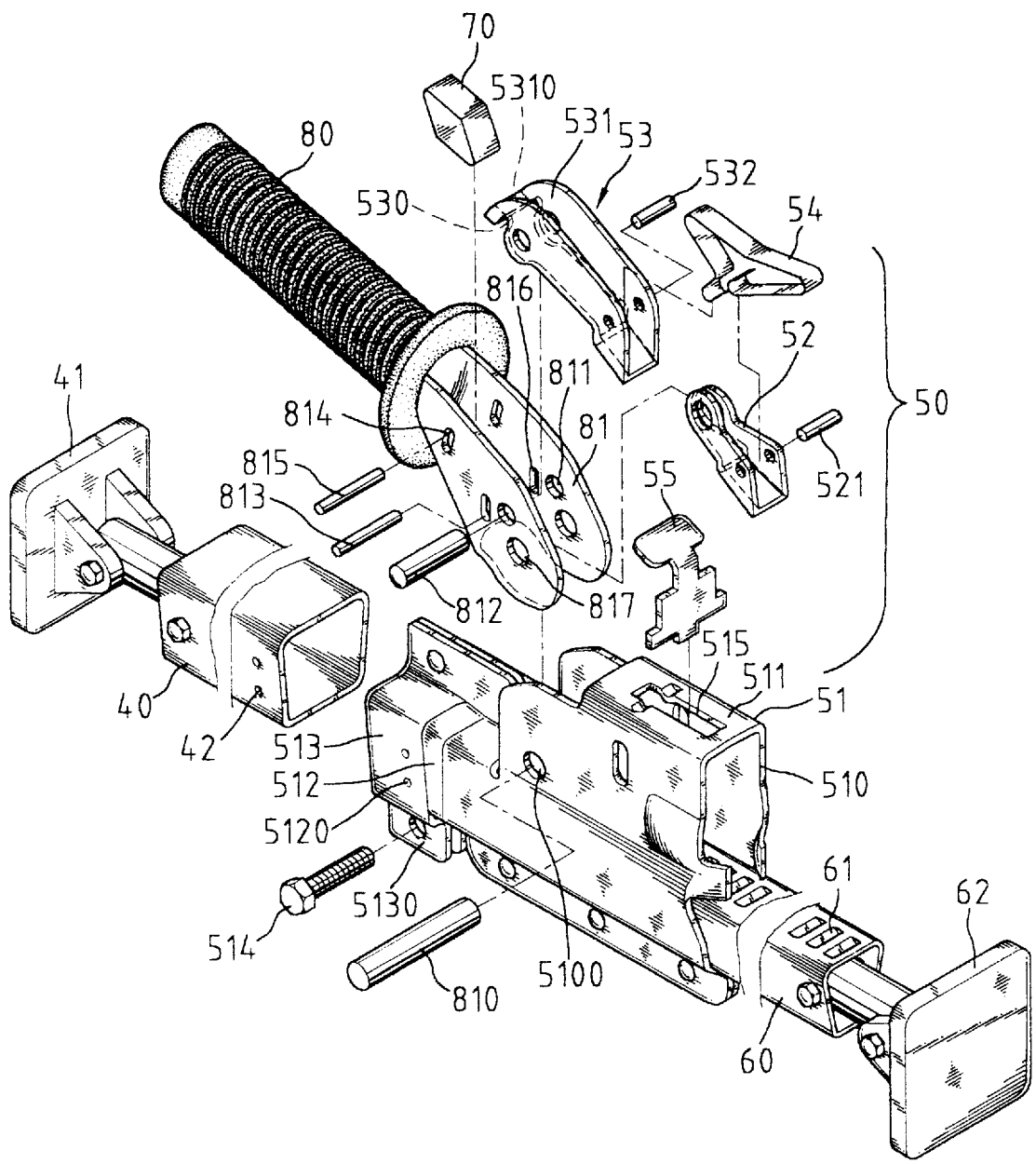
FIG. 5 is an exploded view of the crossbar device in accordance with the present invention.
Figure 6:
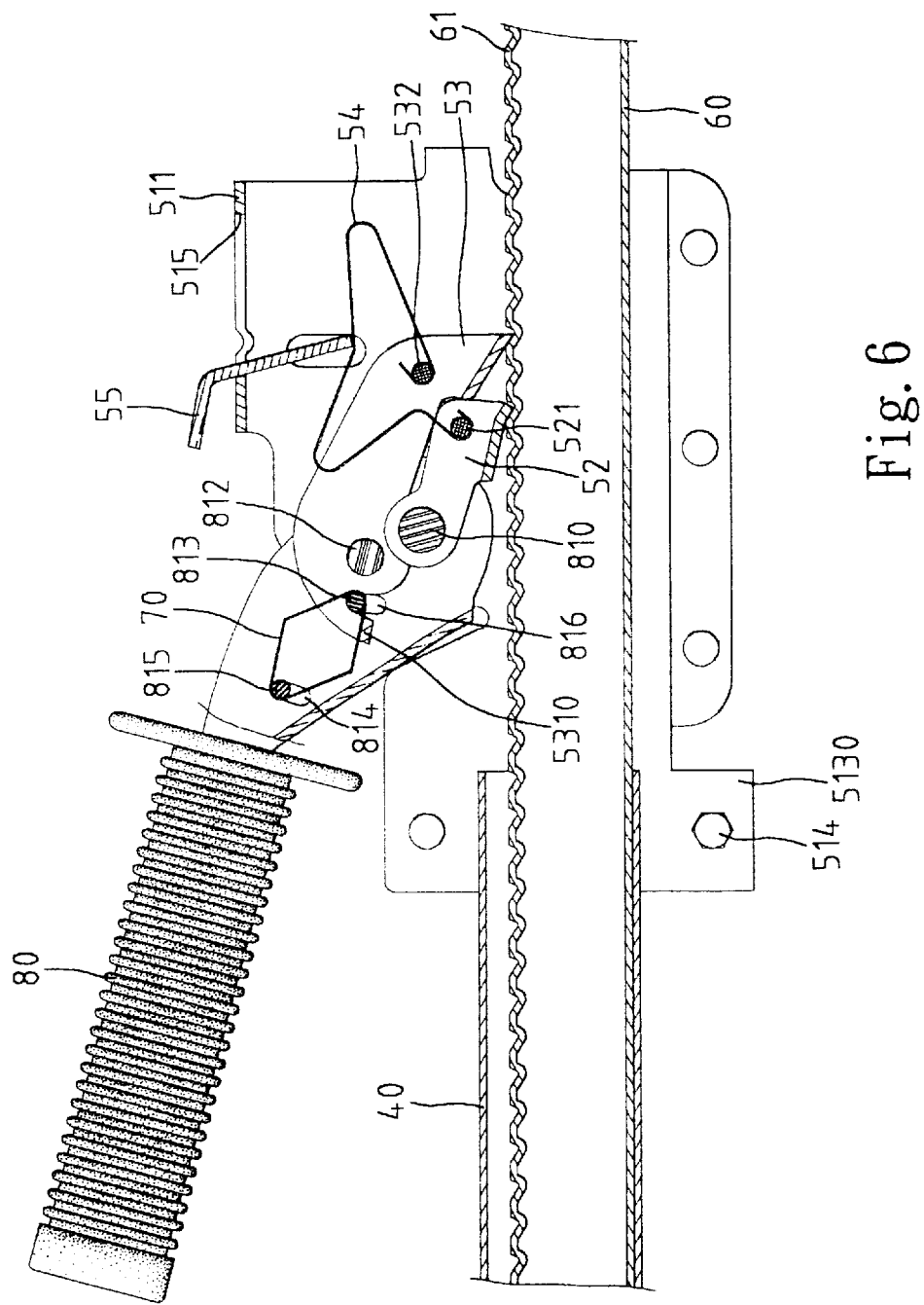
FIG. 6 is a side elevational view, partly in section, of the crossbar device in accordance with the present invention, an inner tube of the device is positioned by pawl members of an adjusting means of the device of the present invention.
Figure 7:
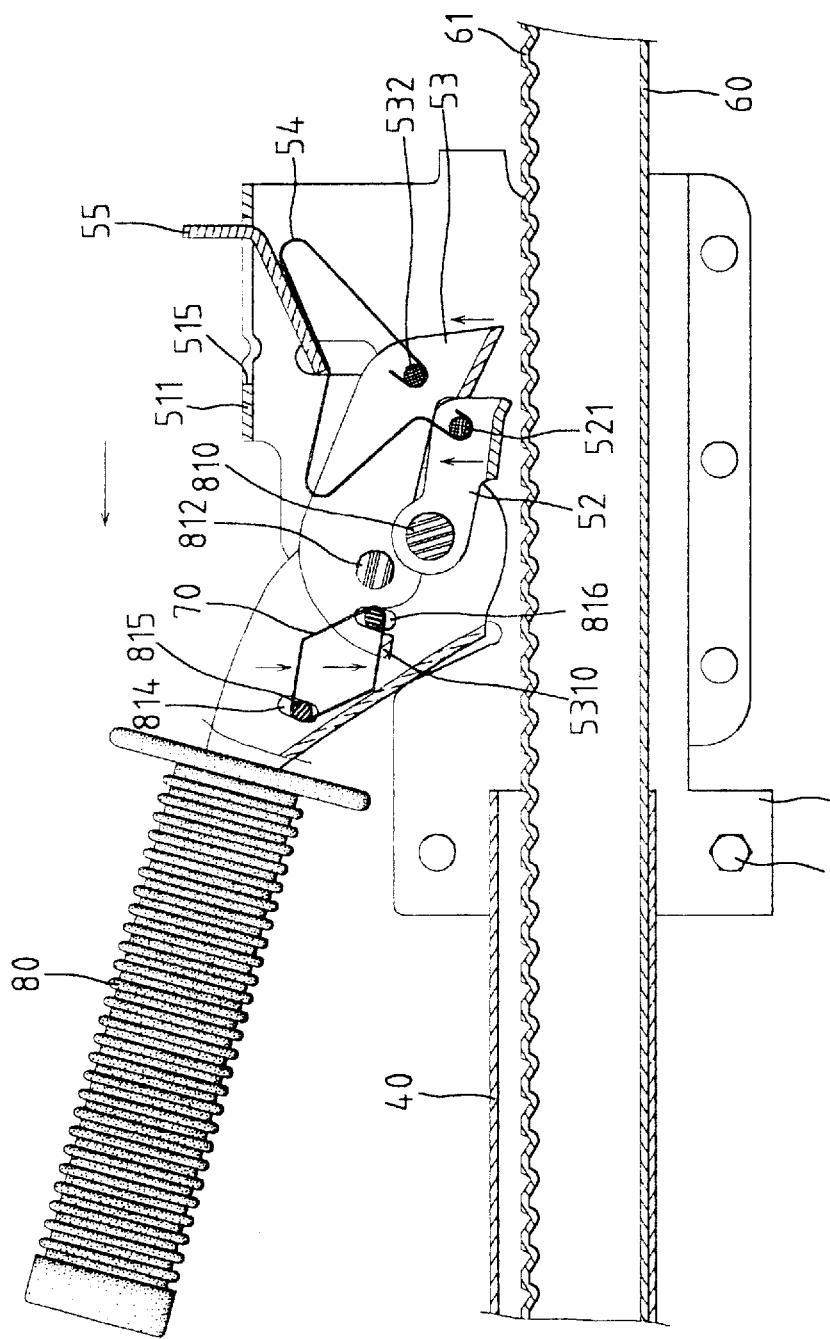
FIG. 7 is a side elevational view, partly in section, of the crossbar device in accordance with the present invention, the pawl members of an adjusting means are disengaged from the inner tube.

Referring to FIGS. 4 through 6, a crossbar device comprises an outer tube 40 with a first contacting member 41 fixedly connected to a first end of the outer tube 40, an inner tube 60 having a first end thereof retractably received in the outer tube 40 and a second contacting member 62 fixedly connected to a second end of the inner tube 60, and an adjusting means 50 disposed to a second end of the outer tube 40. The inner tube 60 has a toothed surface 61 defined in an upper surface thereof.

The adjusting means 50 includes a cover member 51 connected to the second end of the outer tube 60 and including two sidewalls 510 and a top 511. The top 511 has an aperture 515 defined therethrough so that an actuating member 55 is movably inserted therein. The cover member 51 has an enlarged head portion 513 which is connected to the two sidewalls 510 by a divergent neck 512. The head portion 513 has two lugs 5130 formed to an underside thereof and two bosses 5120 extend inwardly and laterally from an inner periphery thereof. The second end of the outer tube 40 is received in the head portion 513 and has two dents 42 defined in an outer periphery thereof so that the two bosses 5120 are received in the two dents 42 and the second end of the outer tube 40 is securely received in the head portion 513 by connecting the two lugs 5130 by a bolt 514. Each of the two sidewalls 510 has an opening 5100 defined therethrough.

A handle 80 has two plates 81 extending therefrom which are inserted between the two sidewalls 510. Each of the plates 81 has a first hole 817, a second hole 811, a first slot 816 and a second slot 814 respectively defined therethrough. A first pawl member 52 and a second pawl member 53 are respectively and pivotally connected between the two plates 81 by respectively extending a first pin 810 and a second pin 812 through the first holes 817 and the second holes 811, wherein the first pin 810 also extends through the two openings 5100. Each of the first pawl member 52 and the second pawl member 53 has a transverse bar 521/532 extending laterally from a lower end thereof so that a connecting member 54 is connected therebetween which is pressed by the actuating member 55. Therefore, as described about the conventional crossbar device, when pressing the connecting member 54 by pulling the actuating member 55 will lower the respective lower ends of the second pawl member 53 and the first pawl member 52 to engage with the toothed surface 61 so as to move the inner tube 60 by the conventional way. An upper end of the second pawl member 53 has a notch 530 defined in an underside thereof so as to receive a third pin 813 therein which is movably received in the two first slots 816. The upper end of the second pawl member 53 further has a longitudinal recess 531 defined therein which has a bottom portion 5310 defining the longitudinal recess 531.

A pushing member 70 is disposed between the two plates 81 and movably between the first slots 816 and the second slots 814. An end of the pushing member 70 has the third pin 813 extending transversely therethrough and is engaged with the upper end of the second pawl member 53 by pressing on the bottom portion 530 defining the longitudinal recess 531. A fourth pin 815 extends transversely through the other end of the pushing member 70 and in movably received in the two second slots 814.

Accordingly, when pushing the pushing member 70 downwardly which pushes the second pawl member 53 together with the first pawl member 52 downwardly with the third pin 813 and the fourth pin 815 moved downwardly within the first and the second slot 816, 814 so that the two pawl members 52, 53 are pivoted to be disengaged from the toothed surface 61 of the inner tube 60.

The invention is not limited to the above embodiment but various modification thereof may be made. It will be understood by those skilled in the art that various changes in form and detail may made without departing from the scope and spirit of the present invention.

What is claimed is:

1. A crossbar device comprising an outer tube with a first contacting member fixedly connected to a first end of said outer tube, an inner tube having a first end thereof retractably received in said outer tube and a second contacting member fixedly connected to a second end of said inner tube, and an adjusting means disposed to a second end of said outer tube, said inner tube having a toothed surface defined in an upper surface thereof;

said adjusting means including a handle from which two plates extend and each of said plates having a first hole, a second hole, a first slot and a second slot respectively defined therethrough, a first pawl member and a second pawl member respectively and pivotally connected between said two plates by respectively extending a first pin and a second pin through said first holes and said second holes, each of said first pawl member and said second pawl member having a transverse bar extending laterally from a lower end thereof so that a connecting member is connected therebetween, a cover member connected to said second end of said outer tube and having an actuating member movably inserted therein so as to press said connecting member to lower said respective lower ends of said first pawl member and said second pawl member to engage with said toothed surface, and a pushing member disposed between said two plates and movably between said first slots and said second slots, said pushing member having an end thereof engaged with an upper end of said second pawl member so that when pushing said pushing member downwardly, said second pawl member together with the first pawl member are pivoted to be disengaged from said toothed surface of said inner tube.

2. The crossbar device as claimed in claim 1, wherein said upper end of said second pawl member has a notch defined in an underside thereof so as to receive a third pin therein which extends through said pushing member and is received in said two first slots.

3. The crossbar device as claimed in claim 1, wherein said upper end of said second pawl member includes a longitudinal recess defined therein which has a bottom portion defining said longitudinal recess, and said pushing member contacts against said bottom portion.

4. The crossbar device as claimed in claim 1, wherein a fourth pin extends through said pushing member and is movably received between said two second slots.

5. The crossbar device as claimed in claim 1, wherein said cover member has an enlarged head portion which has two lugs formed to an underside thereof and two bosses extending inwardly and laterally from an inner periphery thereof, said second end of said outer tube having two dents defined in an outer periphery thereof so that said two bosses are received in said two dents and said second end of said outer tube is securely received in said head portion by connecting said two lugs by a bolt.

* * * * *